(12) United States Patent
Alatorre et al.

(10) Patent No.: US 9,495,640 B1
(45) Date of Patent: *Nov. 15, 2016

(54) INFERRING APPLICATION TYPE BASED ON INPUT-OUTPUT CHARACTERISTICS OF APPLICATION STORAGE RESOURCES

(71) Applicant: International Business Machines Corporation, Armonk, NY (US)

(72) Inventors: Gabriel Alatorre, Long Beach, CA (US); Ann M. Corrao, Raleigh, NC (US); Bernhard J. Klingenberg, Grover Beach, CA (US); James E. Olson, Oxford, CT (US); Ramani R. Routray, San Jose, CA (US); Yang Song, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/157,451

(22) Filed: May 18, 2016

Related U.S. Application Data

(63) Continuation of application No. 14/972,319, filed on Dec. 17, 2015, now Pat. No. 9,372,637, which is a continuation of application No. 14/832,047, filed on Aug. 21, 2015.

(51) Int. Cl.
  *G06F 12/02* (2006.01)
  *G06F 3/06* (2006.01)
  (Continued)

(52) U.S. Cl.
  CPC ............... *G06N 5/04* (2013.01); *G06F 3/061* (2013.01); *G06F 3/067* (2013.01); *G06F 3/0631* (2013.01); *G06F 3/0653* (2013.01); *G06F 7/08* (2013.01); *G06F 12/023* (2013.01); *G06N 99/005* (2013.01)

(58) Field of Classification Search
  CPC .. G06F 3/0604; G06F 3/0605; G06F 3/0629; G06F 3/0631; G06F 12/023; G06F 12/0646; G06F 15/18; G06F 7/08
  See application file for complete search history.

(56) References Cited

U.S. PATENT DOCUMENTS 6,820,035 B1  11/2004  Zahavi
8,381,213 B1   2/2013  Naamad et al.
(Continued)

OTHER PUBLICATIONS

Yin et al., "AutoLoop: Automated Action Selection in the "Observe-Analyze-Act" Loop for Storage Systems", Proceedings of the Sixth IEEE International Workshop on Policies for Distributed Systems and Networks (POLICY'05), pp. 1-10, © IEEE 2005.
(Continued)

*Primary Examiner* — Hal Schnee
(74) *Attorney, Agent, or Firm* — Daniel R. Simek

(57) ABSTRACT

Operational characteristic I/O patterns of each storage volume of a storage volume group, and at least one operational characteristic of each storage volume associated with an application, are determined. Unsupervised learning is used to form clusters of storage volumes of similar characteristics. Labels are generated, assigned, and aggregated for each characteristic of each storage volume. Templates are received that includes labels of storage volume characteristics of known application types. An application type associated with the storage volume group is inferred, based on a best-fit match of the aggregate labels of the storage volumes of the storage volume group to the labels included in the templates of storage volume characteristics of known application types.

1 Claim, 4 Drawing Sheets

(51) Int. Cl.
*G06F 7/08* (2006.01)
*G06N 5/04* (2006.01)
*G06N 99/00* (2010.01)

(56) References Cited

U.S. PATENT DOCUMENTS

| | | | |
|---|---|---|---|
| 8,386,995 | B2 | 2/2013 | Coleman et al. |
| 8,839,262 | B2 | 9/2014 | Ripberger |
| 2012/0330700 | A1 | 12/2012 | Garg et al. |
| 2012/0331114 | A1 | 12/2012 | Garg et al. |
| 2014/0156877 | A1 | 6/2014 | Tylik et al. |

OTHER PUBLICATIONS

IBM, "TranslateMagic: A Framework for Mapping High-Level Quality of Service Behavior to Window-based Flow Control in Storage System", An IP.com Prior Art Database Technical Disclosure, Original Publication Date: May 21, 2007, IP.com No. 000153018, IP.com Electronic Publication: May 21, 2007, pp. 1-8, <http://ip.com/IPCOM/000153018>.

"Storage System Level Resource Auto-rebalance", An IP.com Prior Art Database Technical Disclosure, Authors et. al.: Disclosed Anonymously, IP.com No. 000239626, IP.com Electronic Publication: Nov. 20, 2014, pp. 1-8, <http://null/IPCOM/000239626>.

List of IBM Patents or Patent Applications Treated as Related, Appendix P, Filed Herewith, 2 pages.

Alatorre, et al., "Inferring Application Type Based on Input-Output Characteristics of Application Storage Resources", U.S. Appl. No. 14/832,047, filed Aug. 21, 2015.

Alatorre, et al., "Inferring Application Type Based on Input-Output Characteristics of Application Storage Resources", U.S. Appl. No. 14/972,319, filed Dec. 17, 2015.

| APP. TYPE | I/O SIZE | IOPS | % RD Vs. WR | % RANDOM Vs. SEQUENTIAL |
|---|---|---|---|---|
| WEB APP. HTTP | 64 KB | HIGH | 95% RD / 5% WR | 60% RAND Vs. 40% SEQ. |
| DB | 64 KB | HIGH | 60% RD / 40% WR | 80% RAND / 20% SEQ. |
| LOG | 8 KB | MED | 5% RD / 95% WR | 90% SEQ./ 10% RAND |
| EMAIL APP. | 8 KB | MED | 67% RD / 33% WR | 75% RAMD / 25% SEQ. |
| OLTP DB | 32 KB | HIGH | 70% RD Vs. 30% WR | RANDOM |
| MEDIA STREAMING | 64 KB | HIGH | 98% RD Vs. 2% WR | SEQUENTIAL |
| WEB APP. LOG | 8 KB | LOW | WRITE | SEQUENTIAL |
| DECISION SUPPORT DB | 1 MB | MED | READ | RANDOM |

FIG. 2

INFERRING APPLICATION TYPE BASED ON INPUT-OUTPUT CHARACTERISTICS OF APPLICATION STORAGE RESOURCES

FIELD OF THE INVENTION

The present invention relates generally to the field of structuring information of multiple storage volumes of a data center, and more particularly to determining, by inference, a type of application associated with a group of storage volumes.

BACKGROUND OF THE INVENTION

A single application hosted in a data center, may be associated with multiple storage resources, or "volumes", such as a database application having one volume for transaction logs and another volume for data. Similarly, a Web application supporting online shopping may have an application server hosting middleware to integrate applications that includes one or more dedicated storage volumes, and a database with two additional volumes supporting product information and transaction logs. In some practices, an administrator of the storage resources, often referred to as a storage administrator, may perform manual efforts to document the "grouping information" of the multiple storage resources that are associated with the same application.

It is not uncommon for a storage administrator to record the information on which the grouping of multiple storage resources belonging to the same application is based. Storage administrators of data centers find it helpful to label a group of storage volumes with the associated application in order to provide more applicable support and management of the storage volumes. For example, providing particular backup and maintenance support for storage volumes may depend upon the particular attributes and requirements of the application to which the storage volumes are associated. In practice, however, the detailed description of the associated application is not always available.

In some instances, a storage administrator may determine that a set of storage volumes, for example, volumes 1, 3, and 7, are associated with, sometimes referred to as "belonging to", the same application; however, the exact type of application is not known, possibly due to standardization of information logging methods. Failing to determine the application type to which a group of storage resources are associated may result in unnecessary, inadequate, or in appropriate support from the data center.

SUMMARY

Embodiments of the present invention disclose a computer program product for inferring a type of an application to which a storage volume is associated. The method for inferring a type of an application provides that one or more processors determine at least one characteristic of a plurality of characteristics of storage volume operational metrics for each storage volume of a storage volume group associated with an application, in which the at least one characteristic includes a pattern of input-output (I/O) of a storage volume. One or more processors create a plurality of clusters of storage volumes based on unsupervised machine learning techniques applied to the at least one characteristic of a plurality of characteristics of storage volume operational metrics, in which a characteristic of the plurality of characteristics of storage volume operational metrics includes one or more attributes, and such that a first cluster of the plurality of clusters includes storage volumes that have in common a similar attribute of the at least one characteristic of the plurality of characteristics, and excludes storage volumes of a second cluster that lack the similar attribute of the at least one characteristic of the plurality of characteristics. One or more processors assign one or more labels for each storage volume of the storage volume group associated with the application, based on the at least one characteristic of the plurality of characteristics of storage volume operational metrics for each storage volume of the storage volume group. One or more processors receive at least one template of storage volume characteristics of known application types, wherein each template includes a set of labels that are based on the storage volume characteristics associated with a known application type, and one or more processors infer a type of application associated with the storage volume group, based on a best-fit match of a combination of the one or more labels of each storage volume of the storage volume group to a set of labels that are associated with the templates of storage volume characteristics of known application types.

BRIEF DESCRIPTION OF THE SEVERAL VIEWS OF THE DRAWINGS

FIG. 2 illustrates an exemplary template depicting known characteristics of storage volume groups supporting multiple application types, in accordance with an embodiment of the present invention.

DETAILED DESCRIPTION

Embodiments of the present invention recognize that a group of storage resources that are hosted in a data center environment may be associated with an application; however, information regarding the appropriate application level of the group of storage resources associated with the application may not be known, and therefore the applied application level policy enforcement for support of the group of storage resources may be inappropriate. Embodiments of the present invention provide a method, computer program product, and computer system for inferring an application level based on the operational characteristic patterns of the group of storage resources.

Embodiments of the present invention analyze and identify a group I/O pattern, or group I/O signature, of one or more storage volume resources associated with an application, and compare the group I/O signature with known workload characteristic patterns of types of applications. For example, a known Web application I/O template may include: an HTTP server storage volume having high levels of transactional I/O and conservative down-tiering; an application server storage volume having high level of transactional I/O; and a database application that includes a data volume having large I/O size and heavily random I/O access, and the database application also includes a log volume having small I/O size and mostly sequential I/O. An inference result may include four storage resource volumes all associated with an application. A first volume I/O has an online transaction processing (OLTP) high workload profile and has moved between upper-tiers of storage, remaining mostly on the highest tier. A second volume also has an OLTP high workload profile. The I/O of a third volume has large I/O transfer sizes and mostly random I/O, and a fourth volume has a small I/O transfer size and the I/O is mostly sequential.

Embodiments of the present invention determine an inference based on a best-fit matching technique that correlates the storage volume group I/O behavior characteristics, also referred to as operational characteristics, to the received templates that have known application type I/O characteristic patterns. In the above example, the inferred result suggests that the group of four storage resources associated with an application are likely associated with a Web service application. Determining the type of application to which the group of storage resources are associated enables the appropriate administering of application level policies, which may include applying the best practices of support for the application specific storage volumes, such as, but not limited to, the support tier, response priority, and backup procedures and frequencies.

Figure 1:
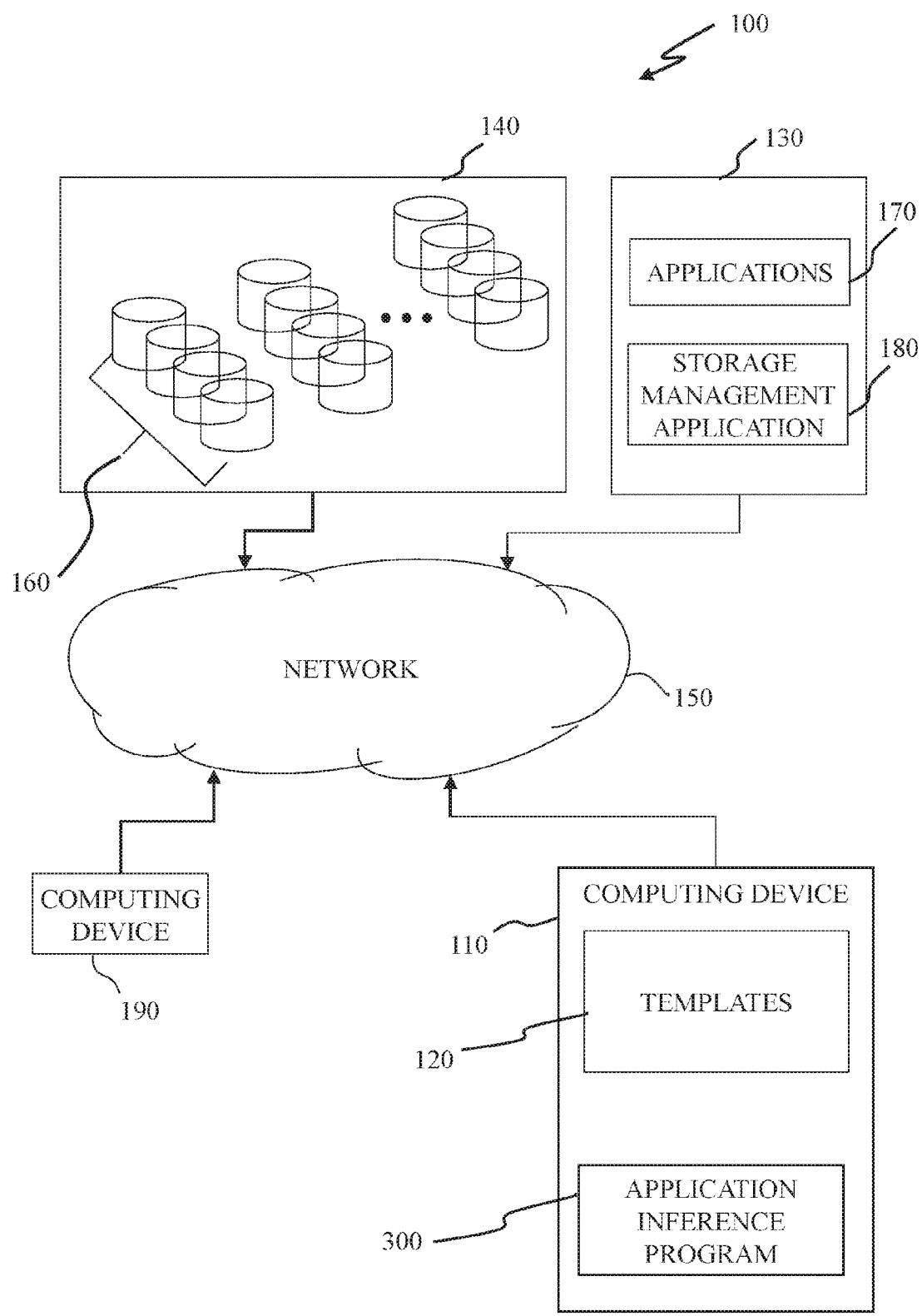
FIG. 1 is a functional block diagram illustrating a distributed network processing environment, in accordance with an embodiment of the present invention.

The present invention will now be described in detail with reference to the Figures. FIG. 1 is a functional block diagram illustrating a distributed application processing environment, generally designated 100, in accordance with an embodiment of the present invention. In some embodiments of the present invention, distributed application processing environment 100 is a software defined environment and may include data center environments supporting operation of various types of applications and a group of storage volumes associated with each application. Distributed application processing environment 100 includes computing device 110, which is depicted as including templates 120 and application inference program 300. Distributed application processing environment 100 also includes storage resources 140, storage volume group 160, server 130, applications 170, storage management applications 180, and computing device 190, all interconnected via network 150.

Computing device 190 accesses one or more applications of applications 170. In some embodiments of the present invention, computing device 190 provides input to applications 170, which uses the input to perform operations. In other embodiments, computing device 190 receives output from an application of applications 170. For example, computing device 190 may access a database application within applications 170 and input a query, which is performed by the database application. Computing device 190 may receive the output of the query, which may be formatted data or may be a report. In some embodiments, computing device 190 is representative of a plurality of computing devices having access to one or more applications of applications 170, hosted on server 130, within distributed application processing environment 100.

In some embodiments computing device 190 may be a laptop computer, a tablet computer, a netbook computer, a personal computer (PC), a desktop computer, a personal digital assistant (PDA), a smart phone, a web server, a mobile computing device, or any other electronic device or computing system capable of receiving and sending data. In other embodiments, computing device 190 represents a virtual computing device of a computing system utilizing multiple computers as a server system, such as in a cloud computing environment. In yet other embodiments, computing device 190 represents an access point to a computing system utilizing clustered computers and components (e.g., database server computers, application server computers, etc.) that act as a single pool of seamless resources when accessed within distributed application processing environment 100. Computing device 190 may include internal and external hardware components, as depicted and described with reference to FIG. 4.

Network 150 can be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support communications between storage resources 140, applications 170, server 130, computing devices 110 and 190, and application inference program 300, in accordance with embodiments of the present invention.

Server 130 is depicted as hosting applications 170. In some embodiments of the present invention, server 130 is included in a data processing center supporting multiple network accessible web applications. In other embodiments, server 130 may represent a plurality of servers supporting applications-as-a-service in distributed application processing environment 100. Server 130 may be a desktop computer, web server, a blade server, or any other electronic device or computing system capable of performing program instructions, and receiving and sending data. In other embodiments, server 130 represents a virtual computing device of a computing system utilizing multiple computers as a server system, such as in a cloud computing environment. In yet other embodiments, server 130 represents an access point to a computing system utilizing clustered computers and components (e.g., database server computers, application server computers, etc.) that act as a single pool of seamless resources when accessed within distributed application processing environment 100. Server 130 may include internal and external hardware components, as depicted and described with reference to FIG. 4.

Applications 170 is a group of applications hosted on server 130 which, in some embodiments of the present invention, may be representative of one or more servers that may act as a seamless provider of application hosting and support. In some embodiments of the present invention, applications 170 includes a variety of applications types, for example, but not limited to, a database application, a media streaming application, an online transaction processing (OLTP) application, a server log application, and a web file application. Each of the application types operating on server 130 is associated with, and makes use of, one or more storage volumes, such as the storage volumes included in storage resources 140. The storage volumes of storage resources 140 enable and support operational activity of the respective applications of applications 170 to which they are associated, and in performing the supporting I/O operational activity of respective applications, the storage volumes of storage resources 140 exhibit operational characteristics.

Storage management application 180 is depicted as being hosted on server 130, and manages the operations associated with the storage volumes of storage resources 140. In embodiments of the present invention, storage management application 180 performs, among other functions and duties, measurement and monitoring activity of the operational and maintenance functions of each storage volume, which includes the operational characteristic patterns of the storage volumes of storage resources 140. Storage management application 180 stores the operational characteristic pattern data of each storage volume of storage resources 140 for access by application inference program 300. In other embodiments, storage management application 180 may be hosted by computing device 110, or another server or computing device having access, via network 150, to storage resources 140.

Storage resources 140 is a plurality of logical and/or physical data storage devices accessible to applications of applications 170 on server 130. A single application operating within a data center, for example, may have access to, and support of, multiple storage resources. The individual storage devices, also referred to as storage volumes, operate with particular input-output (I/O) characteristics based on the type of application the storage volumes are associated with and support. The characteristics associated with the operation of storage devices are determined based on analysis of measured and/or monitored I/O operational metrics, which include, but are not limited to: rate of input-output per second (IOPS), I/O density, ratio of read/write activity, I/O size, sequential/random I/O, temporal storage access patterns, performance tier upgrade/downgrade history, and resiliency requirements.

The operational characteristic patterns of the storage volumes of storage resources 140 are mined, and embodiments of the present invention generate labels for the storage volumes that provide a signature-type identity of each storage volume. In some cases, multiple storage volumes are accessible to an application and support the operations of the application, forming a storage volume group for a given application. The combined operational characteristic patterns, or signatures of the storage volumes, which form the storage volume group supporting an application, are consistent for the particular type of application, within a particular information technology (IT) environment.

For example, a typical web application template may contain an HTTP application and a database application. The storage volumes attached to the HTTP application servers often exhibit highly transactional I/O, so a conservative down-tiering policy is generally applied to the storage volumes supporting this type of application to provide fast response times, but also to realize the cost savings of using lower tiers of storage when lower transactional period opportunities occur. The database server application is often supported by two types of storage volumes, a data storage volume and a log storage volume. The data storage volumes have larger I/O transfer sizes and the I/O transactions are mostly random, whereas the log storage volumes have smaller I/O transfer sizes and the log I/O transactions are mostly sequential. The operational characteristics of the storage volume groups, (hereafter, characteristics) may be correlated to templates of storage volume characteristics of known application types, enabling the application type of the storage volume groups to be inferred.

Storage volume group 160 includes one or more storage volumes of storage resources 140, which are associated with the operational I/O of an application of applications 170. The association of storage volume group 160 to a particular application is sometimes referred to as "belonging" to the application, and includes read, write, and other operational activities in support of the application. In embodiments of the present invention, each application of applications 170 has an associated storage volume group supporting the respective application's I/O operational activity, and administrators of storage resources, such as storage resources 140, have knowledge of which storage volumes belong to a particular application; however, the exact type of the particular application is often unknown to the storage resource administrator.

Computing device 110 is depicted as including templates 120 and application inference program 300, and may also include other applications, such as an operating system application and communication applications, as well as data, (not shown). In some embodiments of the present invention, computing device 110 may be a management server, a web server, a blade server, a mobile computing device, or any other electronic device or computing system capable of receiving and sending data. In other embodiments, computing device 110 may represent a virtual computing device of a computing system utilizing multiple computers as a server system, such as in a cloud computing environment. In another embodiment, computing device 110 may be a laptop computer, a tablet computer, a netbook computer, a personal computer (PC), a desktop computer, a personal digital assistant (PDA), a smart phone, or any programmable electronic device capable of performing the operational steps of application inference program 300, via network 150. In another embodiment, computing device 110 represents a computing system utilizing clustered computers and components (e.g., database server computers, application server computers, etc.) that act as a single pool of seamless resources when accessed within distributed application processing environment 100. Computing device 110 may include internal and external hardware components, as depicted and described with reference to FIG. 4.

Templates 120 are a collection of known application operational and workload characteristic patterns. In some embodiments of the present invention, the IT operation service provider has a set of application templates which specify the expected behaviors of each storage volume associated with a particular type of application. The templates are received by application inference program 300, discussed below, and information associated with the known operational characteristics of particular applications is used to infer an application type to which a storage volume group is associated. In other embodiments, a collection or library of templates that include the storage volume group operational and workload characteristics associated with a particular application type, are accessible via network 150. In some embodiments, the inference of an application type, based on the labels of each volume of the storage volume group, is accomplished by correlating the measured characteristics of the storage volume group of an application to the known application type templates for a particular IT environment, and determining the template having the highest correlation value. In other embodiments, techniques of "best fit" or similarity may be used to determine the application type template that most closely corresponds to the storage volume group characteristics. It is understood that specific storage characteristics associated with an application type may vary for different IT environments, and service providers of each IT environment may generate and publish application type templates for their particular IT environment.

Application inference program 300 is depicted as being hosted on computing device 110, and infers the type of application to which a storage volume group is associated, based on determining the best correlation of characteristic patterns of the storage volume group to a template of known application type characteristics. Application inference program 300 receives storage volume characteristic templates of known application types, and receives input identifying the storage volumes associated with a particular application, which defines the storage volume group for that particular application. In addition, application inference program 300 accesses the measured and monitored characteristic patterns for each storage volume of storage resources, obtained by storage management application 180, for example. The historical metric data for a specified period of time, e.g., past 2 months, can be applied to generate the I/O characteristic patterns, and the measured and monitored data can be periodically updated to reflect the I/O changes.

By applying unsupervised learning methods, application inference program 300 creates groupings (clusters) of storage volumes having similar measurements or monitored results for a given characteristic type. For example, workload levels of storage volumes are measured by a rate of input-output per second (IOPS). TOPS can be expressed in more detail by using one or a combination of total I/O per second, input per second, output per second, or a ratio of input to output per second. Using total TOPS measurements, clustering storage volumes of storage resources 140 may result in forming three groups, one having low level of TOPS, one with a medium level of IOPS, and one with a high level of TOPS, relative to each other. Each storage volume of a particular cluster (low, medium, high, level of TOPS) shares that characteristic pattern with other storage volumes within the same cluster. In some embodiments, larger numbers of clusters may be used for a particular type of characteristic to improve differentiation between application types. In other embodiments, fewer clusters may be appropriate, such as using two clusters for a characteristic of I/O being sequential or random.

Application inference program 300 generates a label for each storage volume of a clustered grouping that corresponds to the designation of the grouping. For example, the storage volumes that are clustered into a grouping designated as low level TOPS all receive the label "low TOPS" for the particular characteristic that measures total TOPS. Similarly, those storage volumes clustered into groupings of medium and high TOPS receive labels of "medium TOPS" and "high TOPS", respectively. Likewise, for a characteristic type that measures the amount of I/O that is sequential or random, storage volumes may be clustered into groupings of similar levels of sequential and random I/O transactions, and receive a corresponding label generated by application inference program 300. For example storage volumes with greater than 50% sequential I/O are labeled as "sequential I/O", and storage volumes with greater than 50% random I/) are labeled as "random I/O". The storage volume labels for each different characteristic of storage volume operation that is measured or monitored by storage management application 180, are concatenated to generate an overall label for the individual storage volume.

Having received input identifying the storage volume group for a particular application, and having generated and concatenated labels for each characteristic type of the storage volumes associated with the particular application, application inference program 300 determines which template of a plurality of templates of storage volume group characteristics for known application types has the highest correlation value with the storage volume group for the particular unknown application. Based on matching the template having the highest correlation value, such as the highest correlation percentage, with the storage volume group labels of the unknown application, application inference program 300 determines the application type associated with the storage volume group. By determining the application type, application level policies, including best practices and guidelines, may be applied to the storage volume group supporting the application, which may improve cost/performance metrics, or improve quality of service.

FIG. 2 illustrates an exemplary template, depicting known characteristics of storage volume groups supporting multiple application types, in accordance with an embodiment of the present invention. The characteristics illustrated in FIG. 2 are simplified for purposes of clarity. Some embodiments of the present invention may include templates having several characteristics of I/O measured and monitored operational behaviors. Other embodiments may include templates having one or two characteristics of I/O measured and monitored operational behavior of storage volume groups. Some templates may include only those characteristics corresponding to a single known application type, whereas other embodiments may include characteristics of multiple known application types, distinctly identified in a single template.

Template 205 includes exemplary characteristic pattern data for multiple known application types. The characteristic pattern data corresponds to storage volume group operational activity associated with known application types. Template 205 includes storage volume group characteristics for web application 210, email application 215, OLTP database (DB) 220, media streaming 225, web application log 230, and decision support database (DB) 235.

Web application 210 is depicted as including application types of an HTTP component, a database application component, and a database log component. The HTTP component has an I/O block size of 64 kilobytes (KB), a high level of TOPS, a 95% to 5% ratio of read I/O activity to write I/O activity, and 60% of I/O activity is random with 40% of I/O activity sequential. The database application component has 64 KB block size, a high level of TOPS with 60% read and 40% write I/O activity, and 80% of the I/O activity being random. The database log component has 8 KB block size and 95% is write I/O activity with 90% of I/O activity being sequential.

Email application 215 depicts template characteristics of an 8 KB block size, medium level of TOPS, two thirds read I/O activity to one third write I/O activity, and 75% of I/O activity is random. OLTP DB 220 is shown with template characteristics of 32 KB I/O size, high level of TOPS, 70% read to 30% write I/O activity, and essentially all random I/O. Media streaming application 225 is shown with a I/O block size of 64 KB and a high level of TOPS, and has 98% of I/O activity as read, with nearly all activity as sequential. Web application log 230 has template characteristics of an 8 KB block size, a low TOPS level, and essentially all I/O activity is sequential write activity. Decision support DB 235 has template characteristics that differ from OLTP DB 220 and the database component of web application 210. Decision support DB 235 has template characteristics of a large 1mega byte (MB) block size, medium level of TOPS, and essentially all I/O activity is random, read activity.

In embodiments of the present invention, storage volume groups are labeled based on clustering of storage volumes into groupings having similar measurements of a characteristic type. A storage volume receives a label for each characteristic type, and in some embodiments of the present invention, pluralities of labels are concatenated resulting in an overall label, for example, an overall label for the storage volume group of an application of unknown type may be: 1 MB block size+medium TOPS+95% read I/O+95% random I/O. The overall label most closely correlates to the template characteristics of a decision support DB application type, such as decision support DB 235.

In another example of an embodiment of the present invention, an application of unknown type is associated with three storage volumes forming storage volume group 160, of storage resources 140. Application inference program 300 determines the labels of each volume of storage volume group 160. One volume of storage volume group 160 has characteristic labels that include a I/O block size of 64 KB, a high level of TOPS, approximately 90% of read I/O activity which is 65% random (64 KB+High-IOPS+90% RD+65% RAND). A second volume of storage volume group 160 has labels indicating an I/O block size of 64 KB and a high level of TOPS, and has 60% read I/O activity, and 80% of the I/O activity is random (64 KB+High-IOPS+60% RD+80% RAND). The third volume of storage volume group 160 has labels that include a smaller, 8 KB I/O block size with medium TOPS levels, and I/O activity is nearly 100% sequential and 100% writing (8 KB+Low-IOPS+ 100% WR+100% SEQ). The labels of the three volumes of the storage volume group are correlated to templates having storage volume labels associated with known application types, and in the above example, the storage volume labels of the unknown application type closely correlate to web application 210. Application inference program 300 indicates that web application 210 has the highest correlation value and infers that the unknown application type is a web application.

In some embodiments of the present invention, application inference program 300 determines a confidence level associated with selection of the application type template having the highest correlation value with the storage volume group labels of an unknown application type. The confidence level of inferring an application type based similarity and matching of characteristic based labels may use a variety of approaches, which may include simply determining the percentage of matching characteristic types between a template and the labels of the storage volume group, or determining a degree of similarity between each label of the template of known application types and each label of the storage volumes of an unknown application type, as well as other approaches. Including a degree of certainty by determining a confidence level of the inference of an application type, may serve to indicate when new templates may be required, or indicate that updates to known application type templates may improve results.

Figure 3:
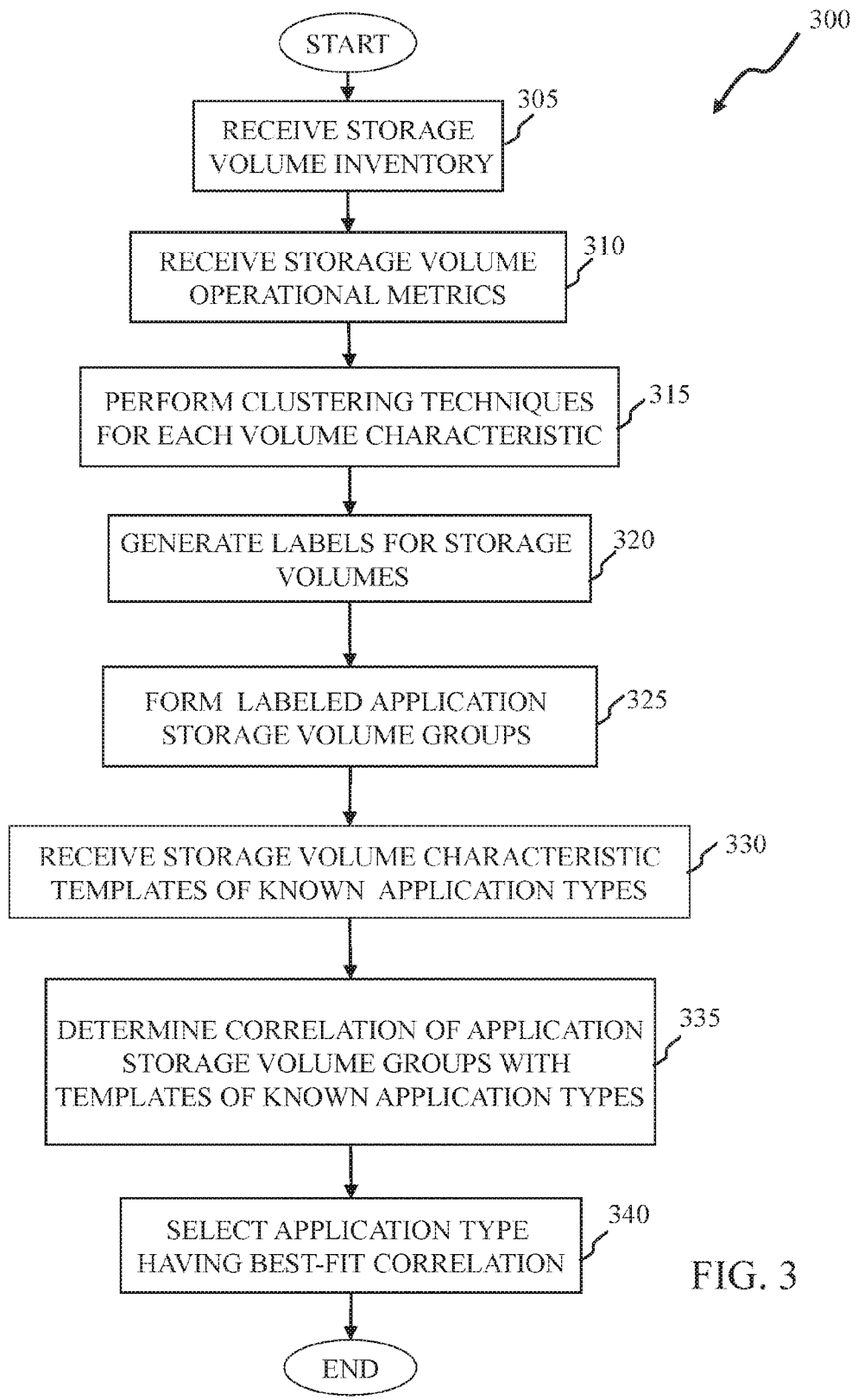
FIG. 3 illustrates operational steps of an application inference program, hosted on a computing device within the distributed application processing environment of FIG. 1, in accordance with an embodiment of the present invention.

FIG. 3 illustrates operational steps of application inference program 300, hosted on computing device 110, within distributed application processing environment 100 of FIG. 1, in accordance with an embodiment of the present invention. In step 305 application inference program 300 receives storage volume inventory. In some embodiments of the present invention, application inference program 300 accesses stored inventory data from a storage management application that includes identification of each storage volume of storage resources within an IT environment accessible to application inference program 300. In other embodiments, application inference program 300 requests and receives the inventory data of storage volumes of the IT environment from a storage management application, such as storage management application 180 (FIG. 1). In yet other embodiments, application inference program 300, having access to storage resources of the IT environment, performs an inventory of the storage volumes.

For example, application inference program 300 requests and receives an inventory of storage volumes of storage resources 140 from storage management application 180 operating on server 130 within distributed application processing environment 100.

In step 310 application inference program 300 receives storage volume operational metrics. In some embodiments of the present invention, the operational activities of each storage volume of a plurality of storage volumes are measured and/or monitored by a storage management application, such as storage management application 180, and the resulting metrics are stored and may be updated at a predetermined interval. The storage volume operational metrics are analyzed to determine characteristics of the I/O activity, and the characteristics of the storage volume may also include environmental conditions in which the storage volume operates. For example, the operational I/O activities may include, but are not limited to, rate of input-output per second (IOPS), I/O density, ratio of read/write activity, I/O size, sequential/random I/O, temporal storage access patterns, and the environmental conditions may include, but are not limited to, performance tier upgrade/downgrade history, and resiliency requirements.

In step 315 application inference program 300 performs clustering techniques to form groupings of similar storage volumes with respect to a particular storage volume characteristic. Having received the operational metrics for the storage volumes, application inference program 300 uses unsupervised learning methods to form groupings of storage volumes based on a similarity of operational characteristics as supported by the metrics and environmental conditions. In some embodiments of the present invention, techniques such as clustering are used to form groupings of storage volumes. In other embodiments, other similarity grouping techniques, such as cosine similarity, are used. For example, application inference program 300 determines a range of TOPS of storage volumes of storage volume group 160, and determines three sub-ranges in which the storage volumes of storage volume group 160 are grouped. The groupings of storage volumes include a low level of TOPS, a medium level of TOPS and a high level of TOPS. Application inference program 300 determines the grouping in which each storage volume is placed for each of the characteristics of storage volumes that are considered. The number of cluster groupings may be predetermined or may be determined based on the range and separation of the characteristic metrics of the storage volumes.

In step 320 application inference program 300 generates labels for storage volumes, in which the labels correspond to the grouping in which the storage volume is placed for each of the storage volume characteristics that are considered. Each storage volume will have an overall label, derived from all labels from each of the storage volume characteristics in which an individual storage volume is grouped. In one embodiment, the overall label may be a concatenation of each characteristic label, with each label separated by one or more characters or spaces. In other embodiments the overall label may be a character string in which all labels are combined in a predetermined sequential order. For example, an overall label of a storage volume may include individual labels for characteristics of I/O block size, TOPS, % read, and % sequential, and may be represented as, 64 KB block size+High level TOPS+75% read+20% sequential.

In step 325 application inference program 300 forms labeled application storage volume groups. In some embodiments of the present invention, a storage administrator of a plurality of storage volume resources has access to information indicating the particular application to which one or more storage volume resources belong, or are associated with. In some instances, storage administrators record the "grouping information" of multiple storage volume resources that belong to the same application, either in a database table or by other labeling techniques, because a storage administrator benefits from associating a group of storage volumes with an application by being able to provide storage volume support and management consistent with the demands and performance expected of the associated application. This may include activities such as backup, maintenance planning, performance tier assignment, as well as other activities.

However, in practice, the detailed description of the associated application is often not available. For example, a storage administrator of a cloud-based storage resource center is able to determine that storage volumes 1, 3, & 7 belong to (provide storage support to) the same application. The exact type of application is not known to the storage administrator, possibly due to the lack of a standardized method for logging this information. In other embodiments of the present invention, storage management application 180 determines the particular application to which one or more storage volumes belong, for example by a database query, or retrieving manual labeling of storage volume association data. The storage volumes that belong to the same application form an application storage volume group, otherwise referred to as a storage volume group, or volume group. Application inference program 300 obtains the information identifying storage volumes comprising a storage volume group of an application, and applies the labels of each storage volume of the storage volume group, by concatenating or combining in some other manner, individual storage volume labels, forming a labeled storage volume group that is associated with a particular type of application. The storage volume group acquires an overall label that is based on the individual labels of each storage volume of the storage volume group.

In step 330 application inference program 300 receives storage volume characteristic templates of known application types. In some embodiments of the present invention, storage volume characteristic templates that include storage characteristics and specifications for specific application types, are provided by the application service provider. IT service providers may make application type templates available in libraries or accessible databases. In some embodiments, the storage volume characteristics of known application type templates are generated by subject matter experts and are made generally available, in other embodiments, the known application type templates may result from benchmarking efforts directed towards IT service providers.

A template of storage volume characteristics of known application types includes one or more labels associated with one or more operational metrics of storage volumes in support and enablement of a particular type of application. Examples of application types may include, but are not limited to, a web application for online purchases, a database application, a log application, a data streaming application, and an email application. Examples of storage volume characteristic metrics include, but are not limited to, TOPS, I/O density, I/O block size, sequential/random ratio, read/write ratio, resiliency profile, I/O volume type (e.g. online transactional, batch processing, distributed transactional), and tier trajectory (historical storage volume tier information).

In step 335 application inference program 300 determines a correlation of application storage volume groups with templates of known application types. For each storage volume within the storage volume group belonging to an application, an aggregate of labels of the storage volume group are correlated to the labels within templates of storage volume characteristics of known application types. In some embodiments of the present invention, application inference program 300 uses a similarity technique to determine a best-fit, or closest-match of the template labels of known application types to the storage volume group labels. In other embodiments of the present invention, application inference program 300 determines a correlation value, such as a correlation percentage of 90%, indicating a degree of matching between labels of the storage volume group and the labels of the template of known application type. For example, a storage volume group that includes two storage volumes, has a first storage volume label of, "high IOPS+70% OLTP+50% read/write ratio+90% random/sequential ratio", and a second storage volume label of "low IOPS+30% OLTP+75% read/write ratio+10% random/sequential ratio". Application inference program 300 determines a correlation between the labels of the storage volume group and a plurality of templates having labels of storage volumes of known application types. Application inference program 300 determines a correlation percentage, for example 30% for a first template, 50% for a second template, 70% for a third template and 90% for a fourth template. In some embodiments of the present invention, a best-fit match is based on a achieving a correlation or similarity value equal to or exceeding a predetermined criteria.

In step 340 application inference program 300 selects an application type having a best-fit correlation value. Application inference program 300 selects an application type corresponding to the template having the highest correlation to the aggregate of the storage volume group labels. In response to determining the correlations of the storage volume group labels to the labels of the known application type templates, application inference program 300 infers the type of application associated with the storage volume group based on the selected application type template. In some embodiments of the present invention, the selection of the application type includes an associated confidence level of the selection, and in some embodiments, the selected application type is reported to a user, or written to a retrievable file. Having determined a best-fit application type for the storage volume group, application inference program 300 ends.

Additional description is now presented that further supports embodiments of the present invention. Embodiments of the present invention utilize the mining of storage volume operational patterns from a perspective of a storage administrator supporting a plurality of storage volume resources within a facility, such as a cloud-based environment of storage resources. Within the storage resources there are a set of storage volumes that are known to be associated, from database query or manual labeling, with a particular application. A problem often faced by a storage administrator role is to determine the type of application to which a set of storage volumes are associated. The set of storage volumes, which are associated with the application by providing storage support and enablement, are referred to as a storage volume group. Embodiments of the present invention pursue an approach of analyzing the I/O characteristics of the storage volume group and infer the type of application the storage volume group belongs to. The motivation for inferring the type of application is for IT operation service providers to make use of application-based best practices, and application-specific guidelines to provide optimal supporting conditions for the storage volume group. Determining the application type of the application that the storage volume group belongs to, by inference of techniques comparing characteristic labels of known application types to characteristics of a storage volume group based on measured and monitored metrics, enables automated application of specific best practices and support guidelines to administered storage volumes. In some embodiments of the present invention, the IT operation service provider has generated a set of application templates which include labels that correspond to the expected operational characteristics of each storage volume associated with a particular application type.

For example, a typical web application template may contain an HTTP application and a database server. The storage volumes attached to the HTTP application typically experience highly transactional I/O, so a conservative down-tier policy is generally in place to provide fast response times but to realize the cost savings of using lower tiers of storage when the opportunities arise. The database server generally has two types of storage volumes, a data volume and a log volume, and generally the data volumes have larger I/O transfer sizes and mostly random I/O whereas the log volumes generally have smaller I/O transfer sizes and mostly sequential I/O. It is noted that the specific storage characteristics may vary for different IT environments and each service provider can publish its own application template. Responsive to determining the application type to which a storage volume group "belongs" or is associated with, storage management policies, which include many best practices and guidelines, can be applied on an application level, e.g., collocation or anti-collocation of two volumes. Embodiments of the present invention aid the storage administrator role in identifying the application associated with a particular storage volume group by mining and analyzing the operational I/O storage metrics and environmental conditions to determine the particular characteristics of the storage volume group.

Embodiments of the present invention measure the storage behavior of each individual storage volume in a storage volume group, determined to be associated with a particular application. The storage I/O operational activity metrics, such as number of TOPS, sequential/random ratio, I/O density, among many other, are measured and/or monitored. In addition, other storage features, such as the environmental conditions for the storage volumes, are captured, such as a storage volume's tier trajectory, which may be used to infer the tier-placement policy of the storage volume (e.g., aggressive down-tier placement, or conservative down-tier placement). It is noted that in practice, the storage characteristics of storage volumes can have a wide spectrum of behaviors, and therefore, clustering methods are used to identify the best "label" that can describe a storage volume's particular storage behavior.

For example, by analyzing the I/O density and the storage tier historical information, a determination of whether the tier placement policy is more akin to "aggressive down-tier placement" or "conservative down-tier placement", can be made. Additionally, the storage volume's access profile is classified by analyzing the TOPS and sequential/random I/O ratio ("high OLTP (online transactional processing)", "low OLTP", "low batch processing", etc.). After each storage volume is labeled for each characteristic considered by using clustering or nearest neighbor methods, the labels are combined (or concatenated, linked, or aggregated in some manner) resulting in a descriptive label for each individual volume such as "high OLTP+progressive tier placement". Having a descriptive combined label for each storage volume of a storage volume group associated with an application (of unknown type), the storage volume group's combined labels are compared to the application templates provided by the IT service provider, for example, which include labels of storage volumes of known application types. Comparing the storage volume group's labels and the template labels, a best (or most likely) matched application template is determined. The application type is inferred from matching the labels of the storage volume group and the known application type template, and the best practices and support guidelines associated with the known application type are applied to the storage volume group.

A step-wise summary is presented for additional description and detail of embodiments of the present invention. Step 1: For each individual storage volume, the storage related characteristics are measured, such as volume type, resiliency profile, TOPS, I/O density, read/write ratio, random/sequential I/O ratios etc. among others. The historical data for a specified time period can be used, e.g., past 2 months, and the measured data can be periodically updated to reflect the I/O changes.

Step 2: Using unsupervised learning techniques of clustering, storage volumes are grouped. This step focuses on identifying groups of similar storage volumes and labeling the volumes to the group to which they belong. For example, for each metric collected in step 1, e.g., TOPS, cluster methods are applied to group volumes into a set of clusters, that may be predetermined, or in some embodiments of the present invention, determined based on the spread of the measured metric, or the need to differentiate a metric into more or fewer cluster groupings. A three group clustering will separate all volumes into "low", "medium", and "high" I/O groups. Similarly, clustering methods can be used on other metrics such as "sequential/random I/O ratio" and divide the volumes to "batch processing" and "online transactional" groups according to their I/O characteristics. After clustering, each volume will have a combined descriptive label such as "high online transactional+aggressive up-tiering."

Step 3: For each volume group that belongs to the same application, the labels of all volumes are compared to the storage specifications provided by the service provider. One simple example is to find the application template which best describes the identified group of labels for the target volume group, e.g., more than 90% of the I/O characteristics (derived from history IO measurement) matches the expected labels specified by the known application I/O template.

Step 4: Match application groups with best practice templates based on tags and information obtained from Steps 1, 2, and 3.

Figure 4:
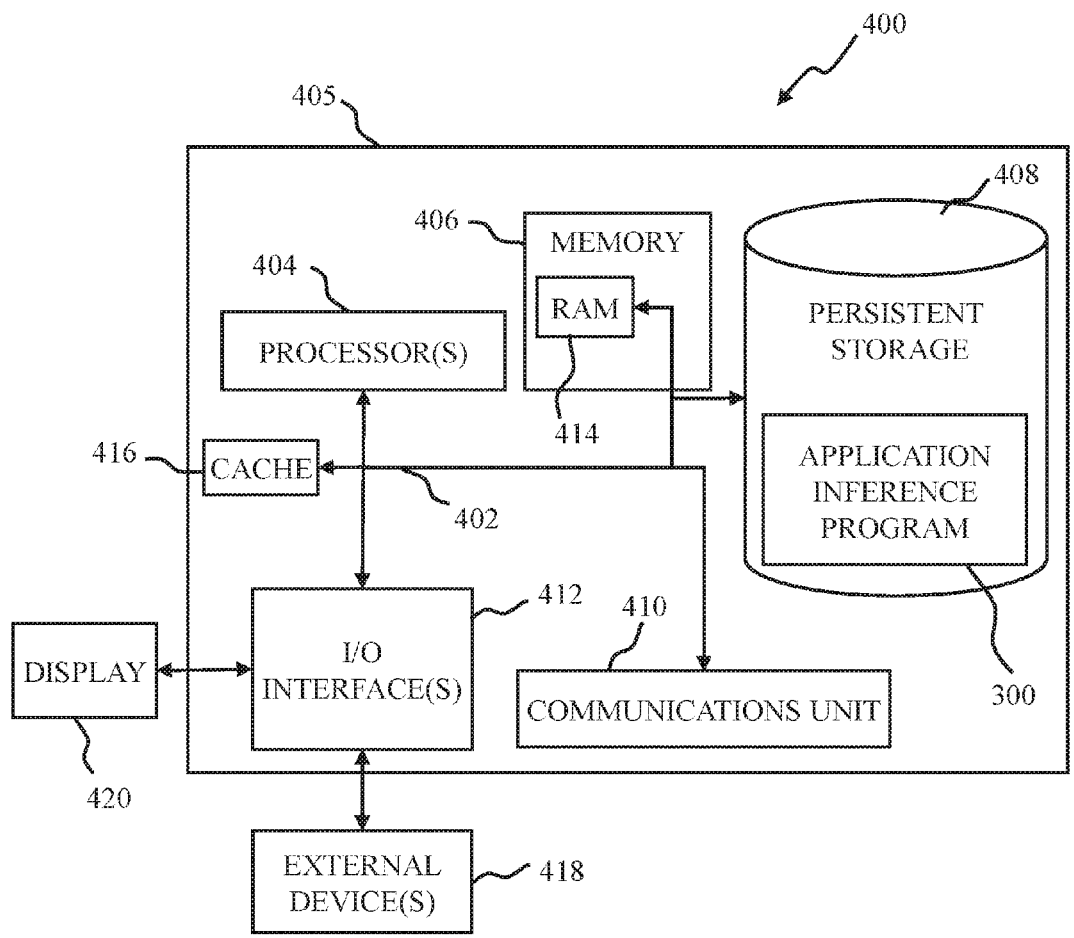
FIG. 4 depicts a block diagram of components of a computing device capable of operationally performing the application inference program, in accordance with an embodiment of the present invention.

FIG. 4 depicts a block diagram of components of computing system 400, including computing device 405, capable of operationally performing the application inference program, in accordance with an embodiment of the present invention.

Computing device 405, includes components and functional capability similar to computing devices 110, 130, and 190, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406, cache memory 416, and persistent storage 408 are computer readable storage media. In this embodiment, memory 406 includes random access memory (RAM) 414. In general, memory 406 can include any suitable volatile or non-volatile computer readable storage media.

In some embodiments of the present invention, application inference program 300 is stored in persistent storage 408 for execution by one or more of the respective computer processors 404 via one or more memories of memory 406. In these embodiments, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of distributed application processing environment 100 and computing devices 110, 130, and 190. In these examples, communications unit 410 includes one or more network interface cards. Communications unit 410 may provide communications through the use of either or both physical and wireless communications links. Application inference program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., application inference program 300 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for inferring a type of an application to which a storage volume is associated, the computer program product comprising:
   one or more computer readable storage media and program instructions stored on the one or more computer readable storage media, the program instructions comprising:
   program instructions to determine at least one characteristic of a plurality of characteristics of storage volume operational metrics for each storage volume of a storage volume group associated with an application, wherein the at least one characteristic includes a pattern of input-output (I/O) of a storage volume;
   program instructions to create a plurality of clusters of storage volumes by utilizing unsupervised machine learning techniques to the at least one characteristic of the plurality of characteristics of storage volume operational metrics, wherein a first cluster of the plurality of clusters includes storage volumes that have a similar attribute of the at least one characteristic that includes a pattern of input-output, and excludes storage volumes that lack the similar attribute of the at least one characteristic that includes the pattern of input-output;
   program instructions to generate a label for each of the storage volumes of the first cluster of the plurality of clusters, which corresponds to the similar attribute of the at least one characteristic of the plurality of characteristics of each storage volume of the first cluster, and generating a label for each of the storage volumes of each cluster of the plurality of clusters, such that a particular label corresponds to storage volumes of a particular cluster having an attribute of a particular characteristic of the at least one characteristic that includes a pattern of input-output;
   program instructions to assign one or more labels to each storage volume of the storage volume group associated with the application, wherein each label of the one or more labels corresponds to a cluster of the plurality of clusters, and each storage volume of the storage volume group is included in one or more clusters by the unsupervised machine learning determining that a storage volume has an attribute of the at least one characteristic corresponding to a cluster of the one or more clusters;
   program instructions to receive at least one template of storage volume characteristics of known application types, wherein each template includes a set of labels that are based on the storage volume characteristics associated with a known application type; and
   program instructions to infer a type of application associated with the storage volume group, based on a best-fit match of a combination of the one or more labels of each storage volume of the storage volume group to a set of labels that are associated with the at least one template of storage volume characteristics of known application types.

* * * * *